United States Patent
Mizuuchi et al.

(10) Patent No.: US 8,451,398 B2
(45) Date of Patent: May 28, 2013

(54) LIGHT SOURCE DEVICE AND LIQUID CRYSTAL DISPLAY DEVICE USING SUCH LIGHT SOURCE DEVICE

(75) Inventors: Kiminori Mizuuchi, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 1051 days.

(21) Appl. No.: 12/279,611

(22) PCT Filed: Feb. 13, 2007

(86) PCT No.: PCT/JP2007/052491
§ 371 (c)(1),
(2), (4) Date: May 12, 2009

(87) PCT Pub. No.: WO2007/094304
PCT Pub. Date: Aug. 23, 2007

(65) Prior Publication Data
US 2010/0231491 A1    Sep. 16, 2010

(30) Foreign Application Priority Data

Feb. 16, 2006  (JP) ................. 2006-038995

(51) Int. Cl.
*G02F 1/1335*    (2006.01)
*F21V 7/04*    (2006.01)
(52) U.S. Cl.
USPC .............................. 349/61; 362/561; 362/611
(58) Field of Classification Search
USPC ..................... 362/611, 561; 349/61
See application file for complete search history.

(56) References Cited

U.S. PATENT DOCUMENTS

| 6,234,639 | B1 | 5/2001 | Noguchi |
| 6,239,851 | B1 | 5/2001 | Hatazawa et al. |
| 6,243,148 | B1 * | 6/2001 | Kaneko et al. ................. 349/61 |
| 7,581,863 | B2 * | 9/2009 | Lester ............................ 362/561 |
| 2004/0012174 | A1 | 1/2004 | Tanaka et al. |

FOREIGN PATENT DOCUMENTS

| JP | 2000-75138 | 3/2000 |
| JP | 2003-207646 | 7/2003 |
| JP | 2003-302918 | 10/2003 |
| JP | 2004-51016 | 2/2004 |
| JP | 2004-127810 | 4/2004 |
| JP | 2004-319364 | 11/2004 |
| JP | 2004319364 A * | 11/2004 |
| JP | 2005-157025 | 6/2005 |
| JP | 2005-215667 | 8/2005 |
| JP | 2005-332719 | 12/2005 |
| WO | 97/14075 | 4/1997 |

OTHER PUBLICATIONS

Chinese Office Action (with English translation) mailed Apr. 13, 2011 in corresponding Chinese Patent Application No. 200780007286.4.
International Search Report issued Mar. 20, 2007 in the International (PCT) Application of which the present application is the U.S. National Stage.

\* cited by examiner

*Primary Examiner* — Nathanael R Briggs
(74) *Attorney, Agent, or Firm* — Wenderoth, Lind & Ponack, L.L.P.

(57) ABSTRACT

A light source device with high use efficiency is provided. By using a laser light source of a single polarization, uniformization of light quantity and uniformization of polarization are simultaneously realized, in a two-dimensional planar illumination utilizing reflection and collimating. Thus, it is possible to realize the two-dimensional planar illumination with polarization aligned, and therefore the use efficiency of light can be significantly improved, when combined with switching utilizing the polarization of a liquid crystal panel, etc.

2 Claims, 10 Drawing Sheets

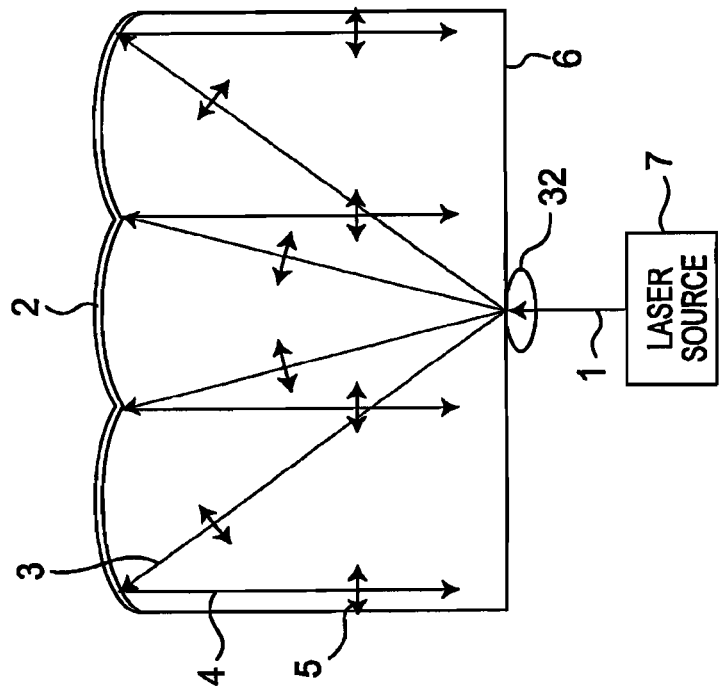
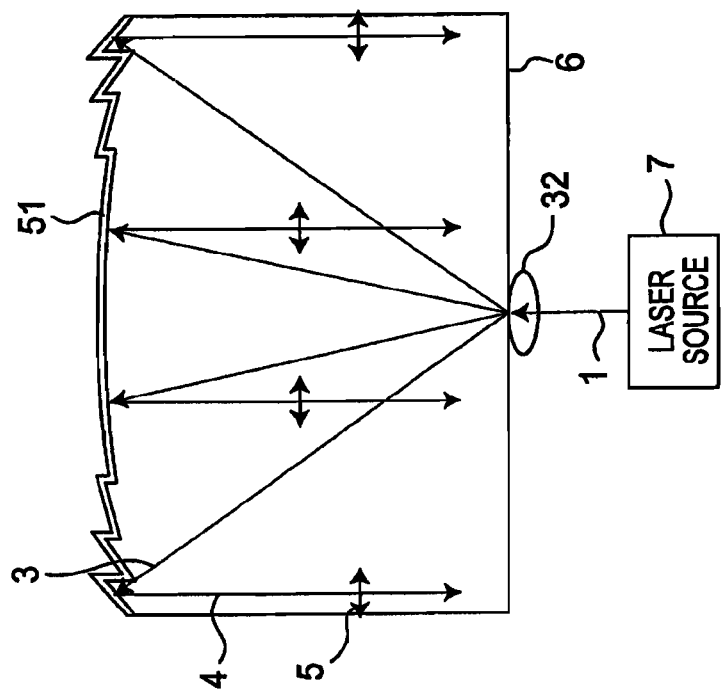

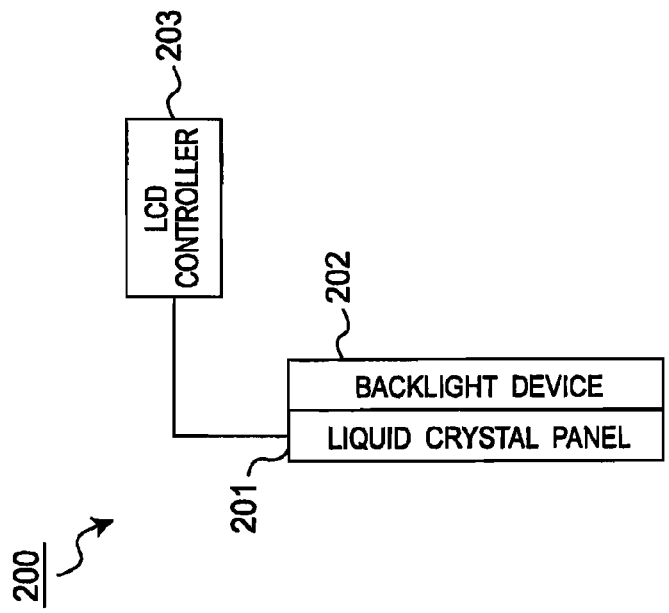
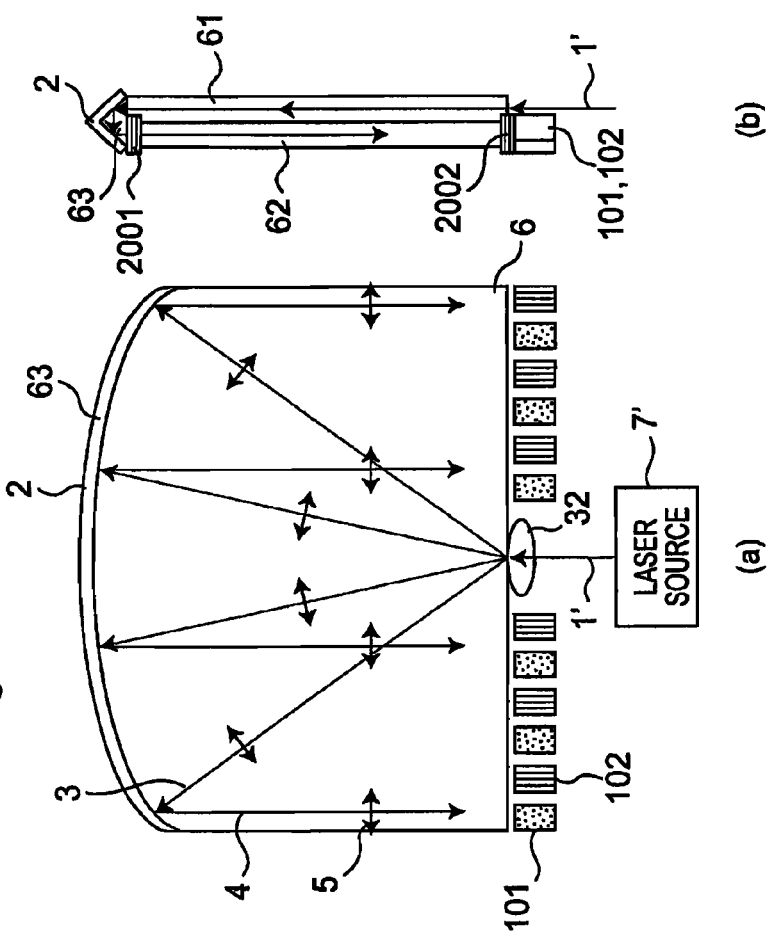

LIGHT SOURCE DEVICE AND LIQUID CRYSTAL DISPLAY DEVICE USING SUCH LIGHT SOURCE DEVICE

TECHNICAL FIELD

The present invention relates to a light source device, and particularly relates to a light source device using laser beams as a light source.

BACKGROUND ART

Conventionally, a display device using a liquid crystal panel requires backlight illumination, and a fluorescent tube and a light emitting diode (LED) are used as light sources of a backlight. In addition, patent document 1 and patent document 2 disclose a system in which the laser beams are used as the light source of the backlight, and by wavelength-converting the laser beams into the fluorescent tube, color display is performed.

Patent Document 1:
  Japanese Patent Publication No. 2004-51016
Patent Document 2:
  Japanese Patent Publication No. 2003-302918

DISCLOSURE OF INVENTION

Problem to be Solved by the Invention

In a liquid crystal panel display device, a problem is that power consumption is increased by a restriction of photo-electric conversion efficiency. Particularly, in a large-scale display, problems to be solved are lower cost and lower power consumption. The fluorescent tube and the LED have a large emitting light size and significantly small use efficiency of light such as about several %, thus increasing the power consumption. In addition, there is a problem that a wavelength of light is restricted in the fluorescent tube, and therefore sufficient color reproducibility can not be obtained, thus making it difficult to obtain a full color expression with high chromaticity. As is shown in the patent documents 1 and 2, when using the laser beams in a state of being fluorescence-converted, there is a problem that the power consumption is increased, because high conversion efficiency can not be obtained.

Utilization of polarized light is given as one of the factors of the aforementioned problem that the use efficiency of light is low in the liquid crystal panel display device having the fluorescent tube and the LED as the light sources. First, in the fluorescent tube and the LED, it is difficult to obtain a single polarized light. Meanwhile, when the light is switched by the liquid crystal panel, contrast is largely lowered unless the single polarized light is used. Therefore, only the single polarized light component of the light inputted in the liquid crystal panel is selected and utilized, and as a result, the use efficiency of the light is significantly lowered.

Meanwhile, a laser light source is capable of outputting the single polarized light. However, a structure of maintaining the single polarized light of the laser beams and utilizing it in the backlight light source is not proposed conventionally. At present, although laser beams are used as the light source, the polarized light is randomly directed. Therefore, only a technique in which the laser beams, with the polarized light not aligned, is used as the light source, like in the case of the LED and a lamp light source, is disclosed. Here, when switching is performed by using the polarized light like the liquid crystal panel, there are problems that the use efficiency is low because of not utilizing the light having different components of the polarized light originally, and that an optical system becomes extremely complicated even if a polarized light conversion device is used for utilizing the light having different components of the polarized light.

In order to solve the above-described problems, the present invention is provided, and an object of the present invention is to construct an optical system of making light quantity of the laser beams uniform and making the polarized light uniform, and realize the light source device using the laser light source with high use efficiency. In addition, by realizing a low power consumption and miniaturization of the light source device, it is possible to be applied to a display used in a mobile device.

Means to Solve the Problem

In order to achieve the above-described object, the present invention is provided. The light source device according to the present invention is the light source device of a liquid crystal panel, including a laser light source of a single polarized light; a waveguide plate; a reflection part provided on an end portion of the waveguide plate; and a lens part provided in the waveguide plate, wherein the laser beams from the laser light source is propagated through the waveguide plate, and thereafter collimated with the reflection part and the lens part, with the polarized light of the laser beams substantially parallel to a surface of the waveguide plate.

Advantage of the Invention

According to the present invention, the laser beams can be set to be a uniform light quantity in the waveguide plate and simultaneously a polarization direction of the laser beams can be aligned, thus realizing the light source device capable of emitting light from a two-dimensional state with high efficiency. By combining this light source device with a two-dimensional switch such as a liquid crystal panel, the liquid crystal panel display device with good efficiency can be realized.

In the light source device of the present invention, electricity can be converted into light with high efficiency, because a laser is used. Further, the light source device of the present invention can utilize purity light having high purity. Therefore, the use efficiency of light is high and a large screen can also be displayed with low power consumption. Further, by using the laser, high color reproducibility can be realized, and a color display of high chromaticity can also be realized.

In addition, when the laser light source is used, there is a problem that an image quality is deteriorated due to a speckle noise generated by its high coherent property. However, such a problem is also solved by the present invention.

BRIEF DESCRIPTION OF DRAWINGS

FIG. 7 is a plan view of an example of the backlight device according to the embodiment 1 of the present invention.

FIG. 8 is a plan view of an example of the backlight device according to the embodiment 1 of the present invention.

FIG. 16 is a plan view (a) and a side sectional view (b) of an example of the backlight device according to the embodiment 3 of the present invention.

FIG. 17 is a block diagram of a liquid crystal display device according to an embodiment 4 of the present invention.

DESCRIPTION OF SIGNS AND NUMERALS

Figure 1:
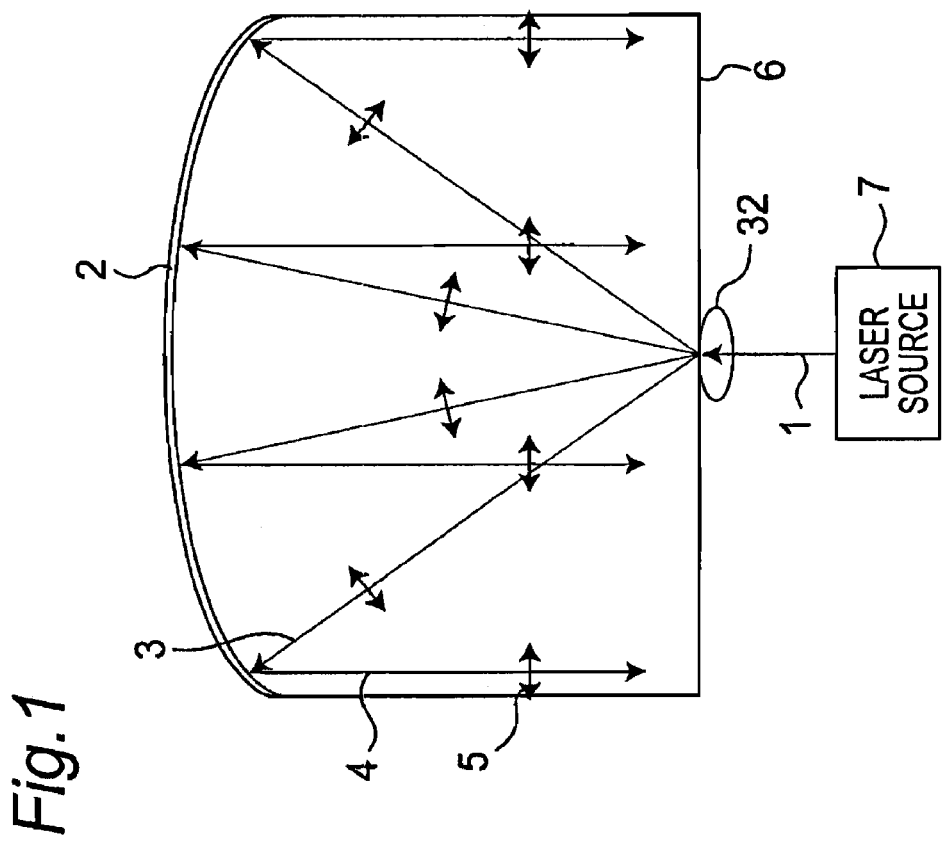
FIG. 1 is a plan view of an example of a backlight device according to an embodiment 1 of the present invention.

1 Laser beams
2 Reflection part
3 Diffused light
4 Collimated light
5 Polarized light direction
6 Waveguide plate
21 Micro-lens
31 Mirror
51 Reflection part
61 First waveguide plate
62 Second waveguide plate
71 ¼ plate
81 Deflector
91 Rotary prism

BEST MODE FOR CARRYING OUT THE INVENTION

A light source device according to the present invention includes a laser light source of a single polarized light and a waveguide plate, making it possible to reflect a diffused light emitted from the laser light source by a reflection part provided on an end portion of the waveguide plate, and by collimating the lights with a lens part uniformize a light quantity of laser beams propagated through the waveguide plate, and align the polarized light of the laser beams. By combining such light source device as backlight and a liquid crystal panel using the polarized light, an efficient two-dimensional display device can be realized. Embodiments of the present invention will be explained hereunder, with reference to the drawings.

Embodiment 1

FIG. 1 is a plan view of a backlight device according to an embodiment 1 of the present invention. The backlight device shown in FIG. 1 includes a laser light source 7 for emitting laser beams of a single polarization; a waveguide plate 6 having a'reflection part 2 provided on an upper end portion; and a (lens) optical system 32 for diffusing the laser beams emitted from the laser light source 7 and making it incident on the waveguide plate 6. The backlight device according to the embodiment 1 can uniformize the light quantity of the laser beams 1 by the waveguide plate 6, and therefore can be used as the backlight for a polarizer switch of a liquid crystal. Usually, when the light quantity is uniformized by the backlight of the liquid crystal panel, the lights are multiple-reflected. However, in a structure of a multiple-reflection, even if the laser light source of a single polarization is used in the light source, the polarized light is directed to directions randomly after all inside of a diffusion plate. Therefore, in order to utilize a switch using the polarized light such as a liquid crystal panel, it must be so constituted that only a particular polarized component is extracted by the polarizing plate. In such a structure, use efficiency of lights is significantly lowered, thus increasing power consumption and complicating an optical system in which the polarizing plate is required, resulting in an increase of cost due to the increase of number of components. Therefore, in the embodiment 1 of the present invention, an efficient backlight device is realized, by utilizing the characteristics of the laser light source, being a single polarized light.

In the backlight device shown in FIG. 1, laser beams 1 incident on a waveguide plate 6 from a laser light source 7 via a proper lens optical system 32 become diffused lights 3, which are then propagated through the waveguide plate 6. Regarding the diffused lights 3, polarizing directions of the laser beams are vertical to (i.e. perpendicular to) traveling directions of waveguide lights, and therefore are spread like a fan inside of the waveguide plate 6. The diffused lights 3 are reflected by a reflection part 2 provided on an end face of the waveguide plate 6. The reflection part 2 is formed, so that a reflection member formed in a concave shape is bonded to an upper end potion of the waveguide plate 6 formed in a convex shape. The reflection part 2 has a lens effect to the diffused lights 3 traveling through the waveguide plate 6, and reflected lights are thereby converted into collimated lights 4. The reflected collimated lights 4 travel through the waveguide plate 6 in a collimated state, and therefore polarizing directions 5 are set in parallel to each other. Thus, it is possible to realize a two-dimensional waveguide light of a single polarization in which the light quantity is uniformized. A device obtained by combining this two-dimensional backlight device, the liquid crystal panel, and the diffusion plate, can be utilized in a display device, a two-dimensional display, or a two-dimensional lighting device, etc. This device is capable of utilizing two-dimensional light of a single polarization having polarized light aligned, and therefore the use efficiency of light is significantly increased.

As the light propagated through the waveguide plate 6, the light of a single polarization parallel to a surface of the waveguide plate 6 is used. By making the polarizing direction parallel to the surface, it is possible to facilitate a switching operation in the liquid crystal panel utilizing the polarized light.

As in a case that the waveguide plate 6 has a double refraction, the waveguide plate 6 is preferably formed by a plurality of thin films. When the waveguide plate of a double refraction is used, the polarized light causes no rotation inside of the waveguide plate 6. Therefore, the single polarization can be maintained, and a conversion into unnecessary light is suppressed, thus making it possible to reduce a loss of lights.

In addition, as a laser light source 7, the laser light source of a semiconductor laser is preferably used. Particularly, as a red laser and a blue laser, a high output semiconductor laser is easily utilized and is effective. When the semiconductor laser is used in the present invention, high output characteristic of several W is required. Therefore, as a structure of the semiconductor laser, preferably the semiconductor laser includes a laser of wide stripe or a laser of multiple stripes having a plurality of lasers of wide stripe provided in parallel.

(Arrangement of Wide Stripe)

When the laser of wide stripe is used as the light source, efficiency for the light to be incident on the waveguide plate 6 can be increased, by setting an arrangement of stripes of the semiconductor laser so that arrangement directions of stripes and the surface of the waveguide plate 6 are parallel to each other. Therefore, it is preferable to set the arrangement of the stripes of the semiconductor laser in parallel to the surface of the waveguide plate 6. However, when the stripes of the semiconductor laser are thus set, the polarizing direction of the semiconductor laser is vertical to the surface of the waveguide plate 6. In order to avoid such a state, a $\lambda/2$ plate is set on a light emitting surface of the semiconductor laser, and the polarizing direction is rotated. Also, in a case of the laser of multiple stripes, a width of a light emitting part becomes wider by several mm. Meanwhile, even in a case of installing a heat sink, an entire body of the device can be made thinner, when the heat sink is set in parallel to the waveguide plate 6. In addition, when a heat pipe is used as cooling means of the heat sink, a cooling liquid is circulated. However, it is possible to obtain a thinner rear surface cooling structure of the laser of multiple stripes, which contributes to making the entire body of the device thinner.

Figure 2:
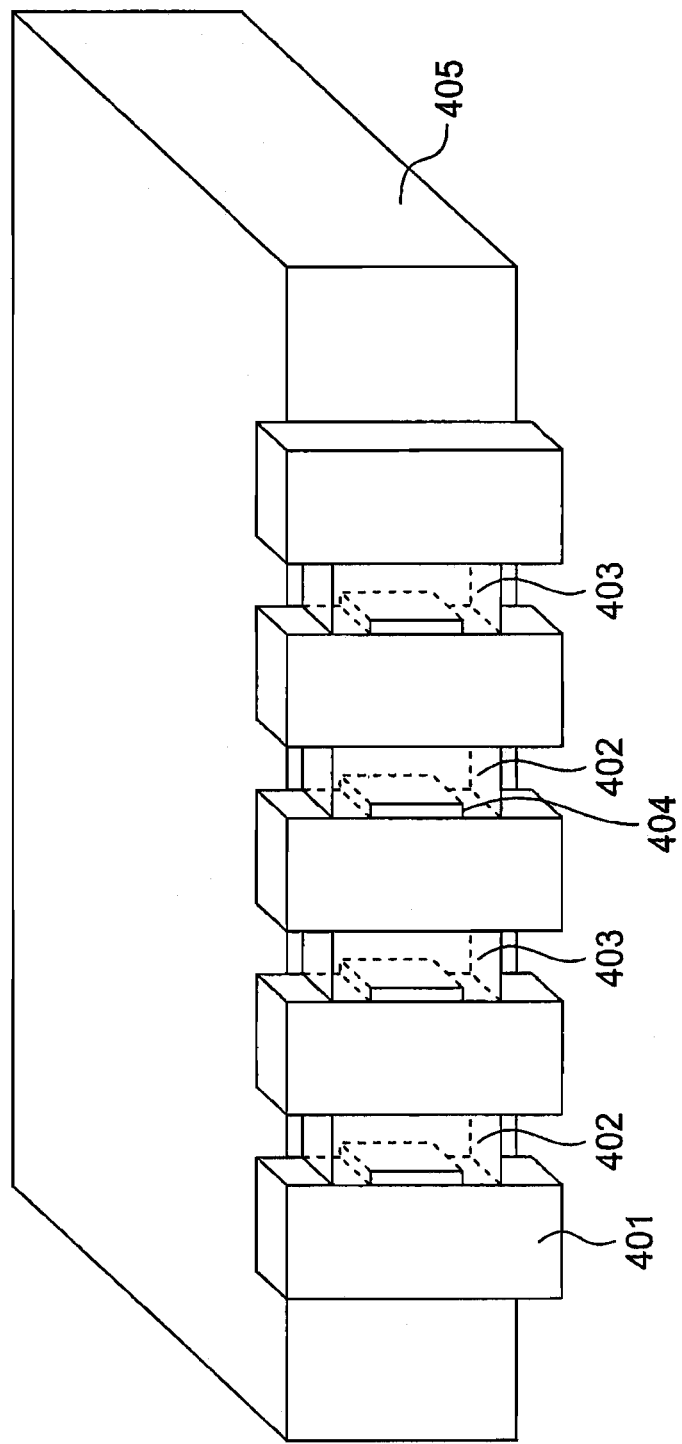
FIG. 2 is a partial perspective view of an example of the backlight device according to the embodiment 1 of the present invention.

Meanwhile, there is also an advantage in the structure of setting the surface of the laser of wide stripe vertically to the surface of the waveguide plate. FIG. 2 is a partial perspective view of the backlight device according to the embodiment 1 of the present invention, and the surface of the laser of wide stripe is set vertically to the surface of the waveguide plate 6. A spread angle of the laser of wide stripe is large by about 30° in a thickness direction of the semiconductor laser, and is small by several degrees in a width direction. By a spread of the light incident on the waveguide plate 6 inside of the waveguide plate 6, uniformity of the light quantity in the waveguide plate can be realized. However, when the spread angle is smaller, a magnifying lens system, etc., is required. Accordingly, by setting the thickness direction in which the spread angle of the semiconductor laser is large, in parallel to the surface of the waveguide plate 6 (namely, the surface of the laser is set vertically to the surface of the waveguide plate 6), the laser beams can be sufficiently spread in the waveguide plate 6, without using the magnifying lens system. Further, there is an advantage in the structure of setting the surface of the laser vertically to the surface of the waveguide plate, in the point that the polarizing direction of the laser can be set in parallel to the waveguide plate, without using the $\lambda/2$ plate. However, a stripe width of the laser of wide stripe is about 100 to 200 μm. Therefore, when the surface of the laser is set vertically to the surface of the waveguide plate 6, bonding efficiency between the semiconductor laser and the waveguide plate 6 is sometimes lowered in a case of a multiple stripe structure. In this case, the bonding efficiency between the semiconductor laser and the waveguide plate can be increased, by using a plurality of wide stripe lasers or constituting them in a stack state.

When a plurality of wide stripe structure is used in a stack state, a sandwich structure as shown in FIG. 2, is preferable in which laser light sources (a blue laser 402, a red laser 403) having active layers 404 are sandwiched between heat sinks 401. By sandwiching the laser light sources between the heat sinks 401, the cooling efficiency of the laser is improved, and a high output of the entire body of the device is realized and a service life can be extended. Further, by improving the cooling efficiency by passing the heat pipe through the heat sinks 401, reliability of the light source can be significantly improved. Even if an interval between light emitting points of the semiconductor laser is set at several mm or more, the laser beams can be spread in the entire body of the waveguide plate 6. Therefore, by providing the heat sinks 401 between the laser light sources, the cooling efficiency of each heat sink 401 is sufficiently increased and thermal separation from laser can be properly performed.

As will be described later, when a red or blue LD (laser diode) is used as the semiconductor laser, a plurality of laser light sources are used. In this case, by alternately arranging the laser light sources of different colors, the uniformity of color in the waveguide plate can be improved. In addition, an emission intensity of the blue LD is larger than that of the red LD, and therefore preferably the red LD is more frequently used. For example, when the red LD and the blue LD are alternately arranged in the number ratio of 2:1, the uniformity of the color in the waveguide plate can be achieved.

(Utilization of Micro-Lens Array)

Figure 3:
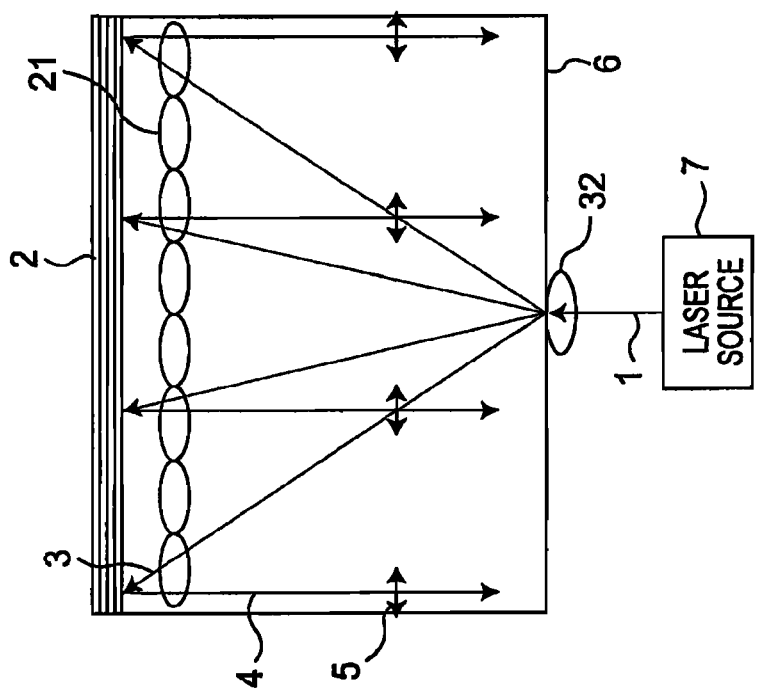
FIG. 3 is a plan view of an example of the backlight device according to the embodiment 1 of the present invention.

FIG. 3 is a plan view of another example of the backlight device according to the embodiment 1 of the present invention. In the backlight device shown in FIG. 3, the waveguide light is collimated with a micro-lens array 21. When a grating structure and a grating lens structure are used, a lens part can be made small, and therefore an entire structure of the backlight device can be made small.

Further, when the micro-lens array 21 is constituted of the liquid crystal, a focal point of the micro-lens array 21 can be changed in time series. With a change of the focal point, a propagation state of the light guided through the waveguide plate 6 is also changed in time series, thus making it possible to reduce a speckle noise. By reciprocation of the guided light in the micro-lens array 21, the change in a beam path is twice, and therefore a power for driving the micro-lens array 21 can also be suppressed low. Further, it is also effective to cause a slight vibration in the micro-lens array 21 or the reflection part 2. By slightly vibrating the micro-lens array 21 or the reflection part 2, the beam path is changed, thus changing a scattering pattern of the laser, and this makes it possible to reduce the speckle noise. Variation of the polarized light is small in the slight vibration, having little influence on the use efficiency which is improved by aligning the polarized light, being an advantage of the present invention, and high efficiency is possible.

(Installation of Mirror on the End Portion Opposite to the Reflection Part)

Figure 4:
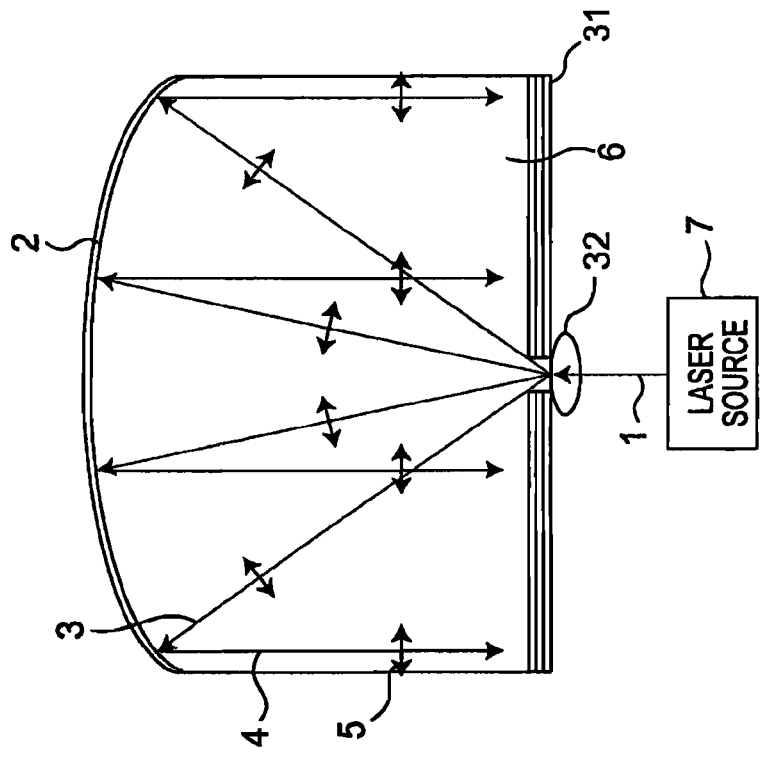
FIG. 4 is a plan view of an example of the backlight device according to the embodiment 1 of the present invention.

FIG. 4 is a plan view of further another example of the backlight device according to the embodiment 1 of the present invention. As shown in FIG. 4, a mirror 31 is installed on the end portion of the waveguide plate 6 where an incident part of the laser exists. Thus, the collimated lights 4 reflected with the reflection part 2 can further be reflected by the mirror 31, and as a result, the light quantity in the waveguide plate 6 can be highly uniformized. In addition, since the use efficiency of the two-dimensional planar illumination of the backlight device is increased, the backlight device having high efficiency can be obtained. A light emitting area of the laser light source 7 is extremely small, and the loss in an opening part of the mirror 31 may be small. When a plurality of laser light sources are used, a plurality of micropores are opened in the mirror 31, so that the laser beams are made incident from the plurality of micropores. Even in this structure, an area of the mirror can be made much larger than the plurality of micropores, and the loss of the laser beams from the micropores is very small.

(Further Uniformization of Light Quantity Distribution)

Figure 5:
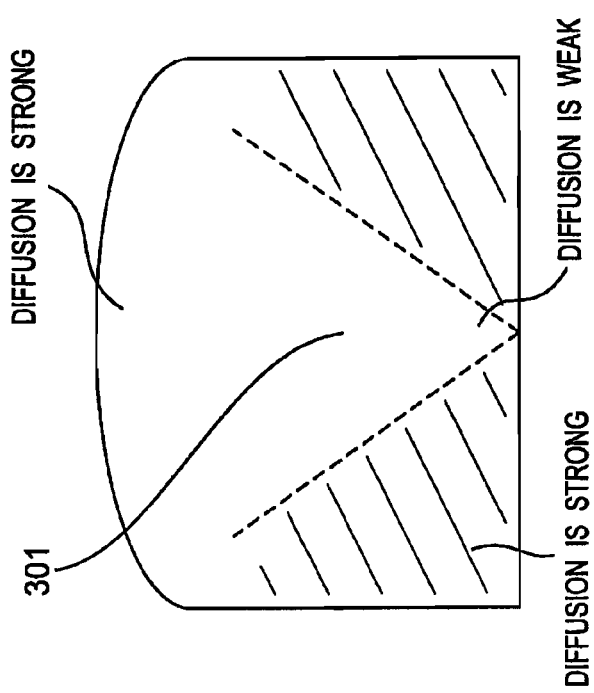
FIG. 5 is a plan view of an example of the backlight device according to the embodiment 1 of the present invention.

Further, FIG. 5 is a constitutional example of a diffusion pattern 301 in the diffusion plate of the backlight device according to the embodiment 1 of the present invention. As shown in FIG. 5, the diffusion pattern is designed so that a diffusion intensity distribution of the laser beams of the waveguide plate is higher in the peripheral part than that of the central part. Namely, when the uniformization and collimating of the light quantity are performed in the waveguide plate, the diffusion pattern distribution of the diffusion plate is set so as to be an inverse function of the light quantity distribution in the waveguide plate, to uniformize the light quantity distribution diffused to the front face by the diffusion plate provided on a rear face of the waveguide plate. Thus, the light quantity of the laser beams that diffuses from the waveguide plate can be highly uniformized.

In addition, when the micro-lens array is used as the lens optical system 32 for spreading green laser beams (as will be described later), an intensity distribution of the laser beams can be uniformized in the waveguide plate 6. When a single lens is used in the lens optical system 32, the intensity distribution in the vicinity of the center of the waveguide plate 6 is higher than that of the peripheral part. Meanwhile, by using the micro-lens array in the lens optical system 32, occurrence of high and low of the intensity distribution can be alleviated, thus making it possible to uniformize the intensity distribution.

(Various Incident Laser Beams)

Figure 6:
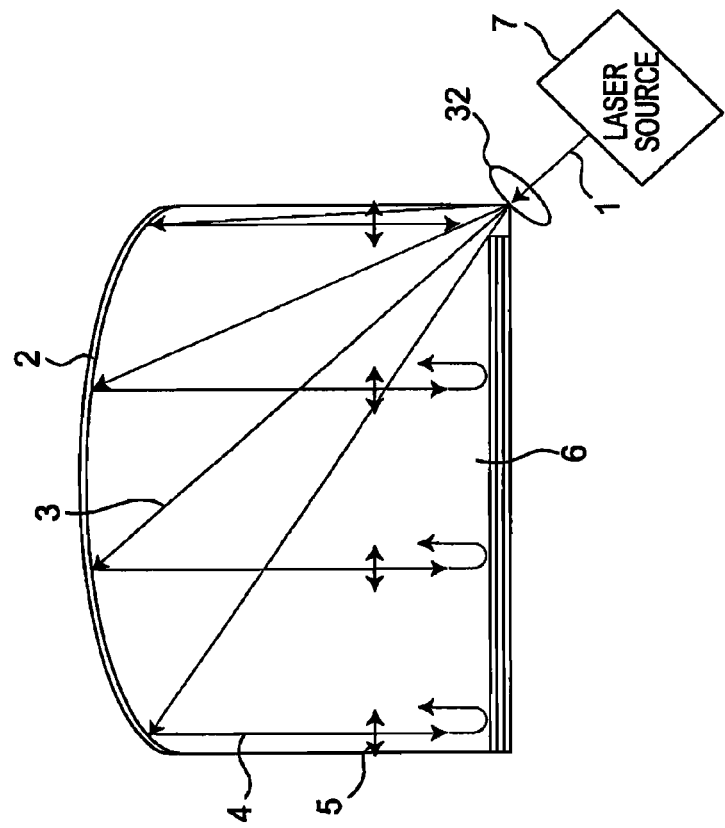
FIG. 6 is a plan view of an example of the backlight device according to the embodiment 1 of the present invention.

Also, FIG. 6 is a plan view of further another example of the backlight device according to the embodiment 1 of the present invention. In the backlight device shown in FIG. 6, the laser beam 1 is made incident from a corner part of a lower end portion of the waveguide plate 6. In either case of making the laser beam 1 incident from the corner part of the lower end portion of the waveguide plate, or making a plurality of laser beams incident from various positions of the lower end portion of the waveguide plate, a collimation state can be realized by the design of the reflection part 2, thus making it possible to realize a uniform backlight of a single polarization.

(Utilization of Fresnel Lens)

FIG. 7 is a plan view of further another example of the backlight device according to the embodiment 1 of the present invention. As shown in FIG. 7, by forming a reflection part 51 in a shape of a Fresnel lens, the area (and volume) of the reflection part 51 can be made smallest, thus making it possible to realize the collimated lights 4. By using a reflection type Fresnel lens, miniaturization of an overall device can be achieved, and by using the laser beams having high coherence, the Fresnel lens can be easily designed.

In addition, when the Fresnel lens is suitably designed, direction of the reflected lights 4 can be partially controlled. For example, by dispersing a reflecting direction of the reflected lights 4 of the central part to both side parts, the light of the central part having high distribution intensity can be dispersed to a side part, and the uniformization of an overall intensity distribution can be achieved.

Further, by focusing on a difference in wavelengths such as RGB laser, etc., distribution of reflection caused by refractive dispersion can be controlled. Namely, in order to increase a degree of free of the position of the light emitting point of RPG laser a reflection distribution must be differentiated depending on color. Particularly (as will be described later), when the green laser beams are the laser beams using the wavelength conversion, luminance of the light source is set high to increase conversion efficiency, and the number of emitting spots is set small. Meanwhile (also as will be described later), when the semiconductor laser is used as the red laser and blue laser, the number of light emitting spots is set large and the luminance of the light source is set low. Thus, it is estimated that the number of light emitting spots and the luminance of the light source are different depending on wavelengths. In such a case, in order to distribute the RBG light uniformly into the waveguide plate by reflection, it is necessary to design for each color the difference in a reflecting distribution caused by refraction and dispersion, by using a grating lens such as a Fresnel lens.

(Division of a Reflection Member of the Reflection Part)

Further, FIG. 8 is a plan view of further another example of the backlight device according to the embodiment 1 of the present invention. As shown in FIG. 8, a concave reflection member of the reflection part 2 is divided into plural parts, and the shape of an upper end portion of the waveguide plate 6 is changed (narrowed) corresponding thereto. Thus, the area of an upper part of the waveguide plate 6 is reduced, thus making it possible to miniaturize an entire body of the backlight device. When the divided reflection member is further divided to be smaller, thus constituting a plurality of micro-concave mirrors of 10 mm or less, and the reflection part 2 is thereby constituted, an upper bulge of the waveguide plate 6 shown in FIG. 1 can be eliminated, thus making it possible to miniaturize the entire body of the device. Simultaneously, of course the uniformization of the light quantity is achieved. Namely, when a reflecting distribution of the micro concave mirror is designed so that the light quantity distribution formed by multiplexing each reflected light of the micro-concave mirror is a uniform distribution, the uniformization of a distribution of the light quantity formed by the backlight is achieved.

In addition, when the micro concave mirror is used, the phase of the light reflected at a slight deflection angle is largely changed when scanned with the laser beams, and therefore it is possible to obtain an advantage that a reduction effect of the speckle noise is increased.

(Example of Multiple-Reflecting the Collimated Lights)

Figure 9:
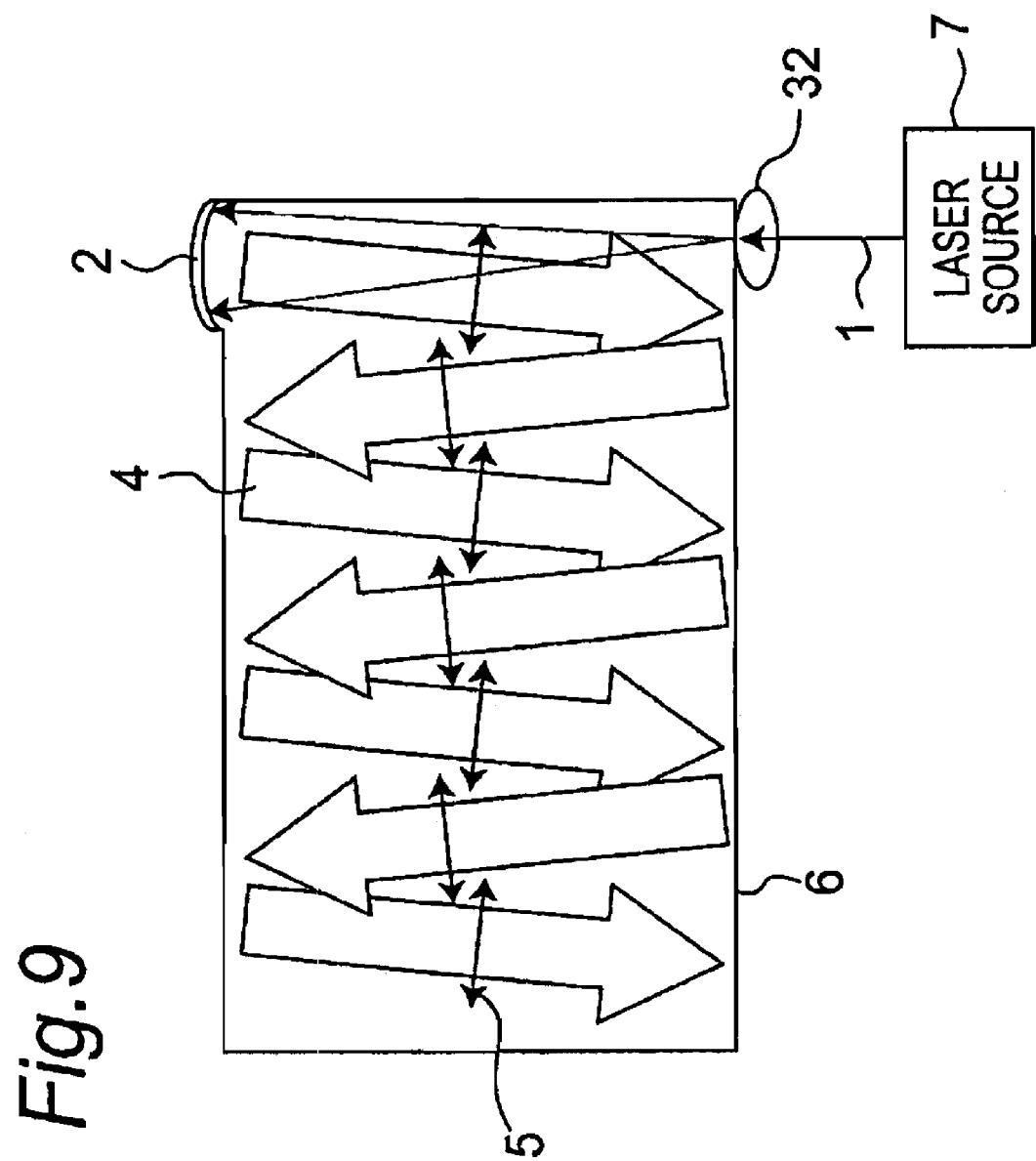
FIG. 9 is a plan view of an example of the backlight device according to the embodiment 1 of the present invention.

Further, FIG. 9 is a plan view of further another example of the backlight device according to the embodiment 1 of the present invention. In the waveguide plate 6 shown in FIG. 9, the collimated lights of the reflection part 2 are multiple-reflected at upper and lower end portions of the waveguide plate 6. Thus, the uniformization of the light quantity in the waveguide plate 6 can be achieved. By making a reflection angle almost vertical to the end face, the polarizations of the collimated lights can be maintained almost parallel, and the use efficiency of light can be improved.

As described above, the embodiment 1 of the present invention has been explained by various examples, the structure of the present invention is suitably applied to a mobile device, etc. Namely, power consumption of a battery can be suppressed, because the power consumption can be significantly reduced, thus making it possible to use the battery for a long period of time by a prescribed amount of charge. Also, as described above, when visible lasers of red, blue, and green are used as the laser beams, color display is possible. By sequentially lighting the laser beams, full color display is also possible.

Embodiment 2

(Waveguide Plate of Two-Layer Structure)

Figure 10:
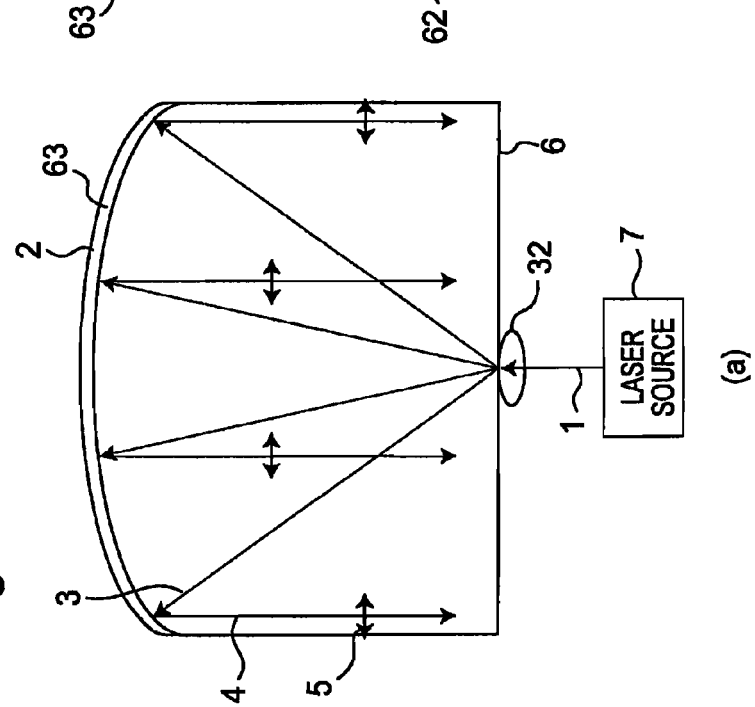
FIG. 10 is a plan view (a) and a side sectional view (b) of an example of the backlight device according to an embodiment 2 of the present invention.

FIG. 10 is a plan view (a) and a side sectional view (b) of one example of the backlight device according to an embodiment 2 of the present invention. The side sectional view (b) is a vertical section passing through a central vertical axis (not shown) of the plan view (a). Note that the backlight device according to the embodiment 2 of the present invention is approximately the same as the backlight device according to the embodiment 1 shown in FIG. 1. Accordingly, the same signs and numerals are assigned to the same part, and explanation therefore is omitted.

In the backlight device shown in FIG. 10, the waveguide plate has a two-layer structure (a first waveguide plate 61 and a second waveguide plate 62). The laser beam 1 is made incident on the first waveguide plate 61 and is propagated as diffused lights, and is guided to the second waveguide plate 62 by a rectangular prism 63 constituting the reflection part 2. In the second waveguide plate 62, the laser beams are collimated lights 4, and polarizations 5 are parallel to the surface of the waveguide plate. In the backlight device according to the embodiment 2 also, the uniformization of the light quantity inside of the waveguide plate (particularly the second waveguide plate 62) and collimating of the laser beams are realized.

As described above, in the two-layer structure, the second waveguide plate 62 allows only the collimated lights to propagate. Therefore, when the two-dimensional image is displayed by a device formed by combining this two-dimensional backlight device, the liquid crystal panel, and the diffusion plate, the polarizing plate for separating the polarization of the light incident on the liquid crystal panel can be eliminated. Thus, the backlight device of low power consumption excellent in use efficiency of light can be realized. Note that the waveguide plate of two-layer structure shown in FIG. 10 can be combined with various structures shown in the aforementioned FIG. 3 to FIG. 7.

(Utilization of λ/4 Plate)

Figure 11:
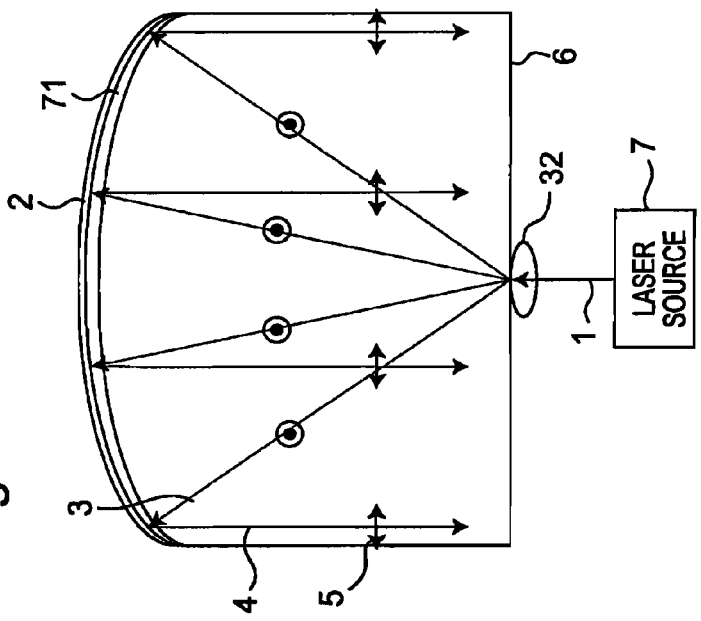
FIG. 11 is a plan view of an example of the backlight device according to the embodiment 2 of the present invention.

FIG. 11 is a plan view of another example of the backlight device according to the embodiment 2 of the present invention. The backlight device shown in FIG. 11 utilizes the characteristic of the polarization and reflection. Namely, in the backlight device shown in FIG. 11, a λ/4 plate 71 is thinly accumulated on an inside of the reflection part 2.

The laser beam 1 incident on the waveguide plate 6 becomes a diffused light 3 and is reflected by the reflection part 2. Incidentally, the laser beam 1 is previously set to have the polarization vertical to the surface of the waveguide plate 6. Here, since the λ/4 plate 71 is provided on the inside of the reflection part 2, the reflected laser beam 1 passes through the λ/4 plate 71 twice, with the polarization rotated by 90°, and is converted so that the polarization is parallel to the surface of the waveguide plate 6 as a result. The laser beams reflected by the reflection part 2 and collimated, are the collimated lights 4 and are the lights with uniform light quantity, with the polarization set parallel to the surface of the waveguide plate. Thus, by differentiating the polarization between the incident light and the reflected light, only the reflected light can be extracted to outside by using polarization separation. Namely, even in a case of one-layer structure, the two dimensional planar backlight light source, with the polarization aligned, can be realized. In addition, the waveguide plate shown in FIG. 11 can be combined with various structures shown in the aforementioned FIG. 3 to FIG. 7.

(Other Example of the Backlight Device)

In the backlight device according to the embodiment 1 or the embodiment 2 of the present invention, the light source of further other color in addition to the laser light source of three colors such as RGB can be added, as the laser light source, because color reproducibility is improved, and this is preferable. By adding the laser light source of different colors, a chromaticity range that can be expressed can be largely expanded.

Further, since the laser beams have a high coherence, grating, etc., can be used. When it is so constituted that a reflection type grating structure is formed on the surface of the reflection part 2, so that the laser beams are uniformly emitted on the liquid crystal panel by a diffraction pattern of light, the uniformization of the light quantity of the liquid crystal panel can be achieved with a simple optical system. A semiconductor laser, a solid laser, and a fiber laser, etc., can be used as an RGB light source. In any one of these lasers, photo-electric conversion efficiency is extremely high, such as 20% to 40%. Further, only a spectrum of light having high coherence and required for the color display can be oscillated, and therefore the light can be utilized without waste, for RGB (red, green, blue) display.

In the backlight device according to the embodiment 1 or the embodiment 2 of the present invention, by using the laser, the waveguide plate can be made thinner. In a conventional backlight device using a fluorescent tube or LED, at least several mm of thickness is required for the waveguide plate. This is because the light emitting surface of the fluorescent tube and the LED has a size of $mm^2$ order, which is considerably large, and a coupling efficiency with the waveguide plate is significantly lowered, unless the waveguide plate has a sufficient thickness. Meanwhile, the light emitting surface of the laser has a size of several μm×several 100 μm, which is significantly small. This is advantageous for light weight, miniaturization, and low cost of the backlight device. When a thickness direction of a laser active layer is aligned in the thickness direction of the waveguide plate, the size of the light emitting surface of the laser is several μm in the thickness direction, and when the waveguide plate has the thickness of 10 μm or more, coupling with the laser beams is possible with high efficiency of 90% or more.

In addition, when the waveguide plate is constituted of a plurality of thin films, the waveguide plate having double refraction can be easily realized. By adding stress to the thin films, each thin film can have a refraction index. In this case, a strong stress can be held by each thin film, and therefore there is also an advantage that the thin film having double refraction with high reliability can be realized.

Also, by modulating the intensity of the laser light source, in accordance with a luminance required for operating a display device, the power consumption can be reduced. In a case of the laser beams, intensity modulation is easy, and in accordance with a maximum luminance of a screen to be displayed, the intensity of the laser beams is modulated, thus making it possible to significantly suppress power required for emitting the laser beams. Meanwhile, in the fluorescence tube of a conventional art, the intensity modulation at a high speed is difficult. In the LED of a conventional art, it is difficult to separately control the intensity of a plurality of LEDs, and a gradation of output intensity is poor, because color is largely changed by the intensity.

It can also be so constituted that by utilizing the backlight device according to the embodiment 1 or the embodiment 2 of the present invention, two-dimensional image data is placed on the incident laser beam 1. Namely, the light whose image is previously converted by a two-dimensional switching device is propagated through the waveguide plate, which is then expanded and displayed by the waveguide plate. In such a structure also, by using the laser beams, coupling with the waveguide plate is significantly improved. Further, since the polarization can be maintained, contrast of a displayed image is significantly increased.

In the backlight device described heretofore, the waveguide plate is set as a parallel flat plate. However, the waveguide plate may be constituted in a taper structure that a space between the front surface and the rear surface is slightly narrower in an upper part, and a space between the front surface and the rear surface is slightly wider in a lower part.

When such a taper structure is utilized, it is possible to increase diffusion in the peripheral part where the light quantity distribution is likely to be low, and the uniformization of an overall diffusion can be achieved as a result.

Embodiment 3

In an embodiment 3 of the present invention, explanation will be given for the structure regarding a reduction of the speckle noise in the waveguide plate 6. The laser beams have a high coherence, thus generating the speckle noise due to interference of the light. Therefore, when the image is constituted as it is by the laser beams, an image quality is not so good. In order to avoid such a state, it is important to reduce the speckle noise.

(Utilization of a Deflector)

Figure 12:
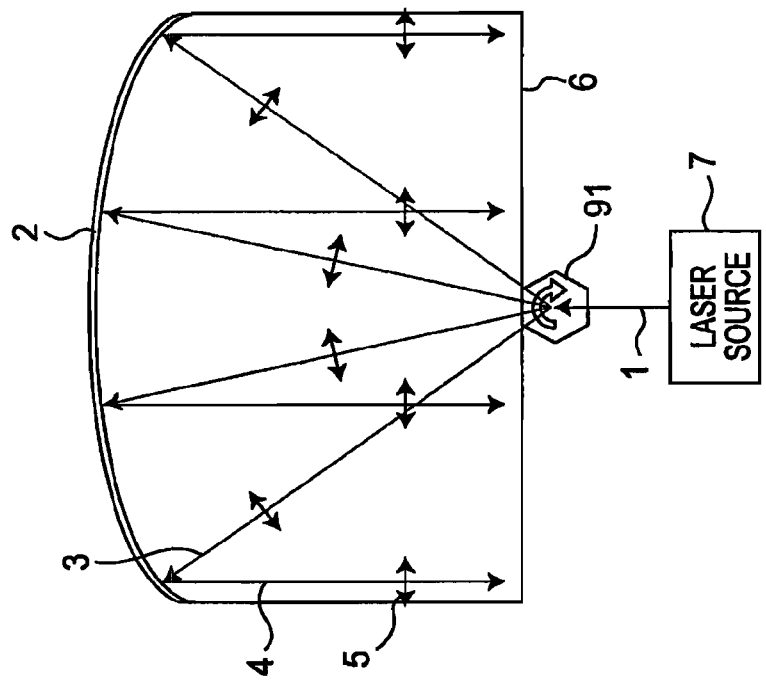
FIG. 12 is a plan view of an example of the backlight device according to the embodiment 2 of the present invention.

FIG. 12 is a plan view of one example of the backlight device according to the embodiment 3 of the present invention. Note that the backlight device according to the embodiment 3 of the present invention is also approximately similar to the backlight device according to the embodiment 1 and the backlight device according to the embodiment 2. Accordingly, the same signs and numerals are assigned to the same part, and explanation therefore is omitted.

In the backlight device shown in FIG. 12, a deflector 81 is provided in the vicinity of the incident part of the laser light source 7. By this deflector 81, the direction of the laser beams is changed in time series, thereby changing the phase of the guided light in time series, and as a result, the speckle noise is reduced.

The reduction of the spectacle noise is also possible even if not by using the deflector but by using a device for slightly changing the phase and the polarization in time series.

(Utilization of a Rotary Prism)

Figure 13:
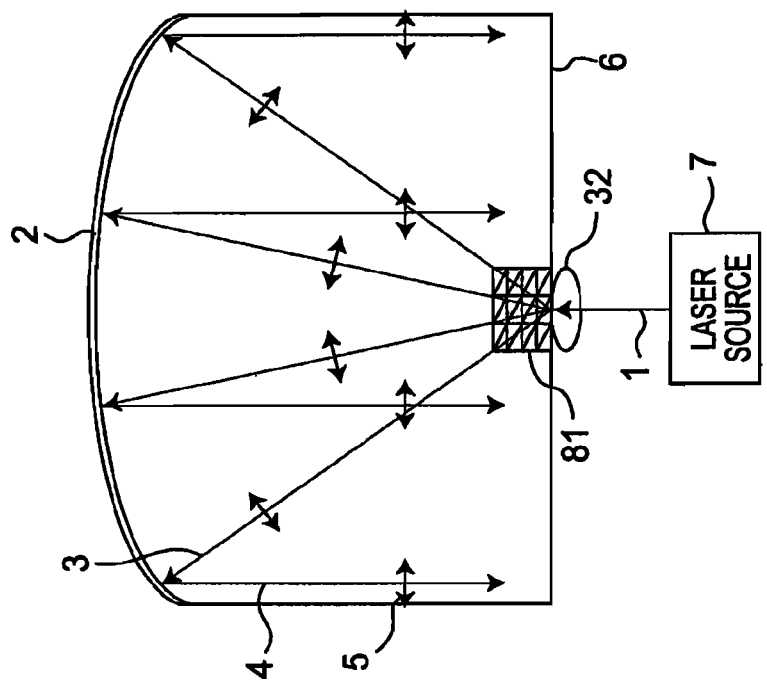
FIG. 13 is a plan view of an example of the backlight device according to an embodiment 3 of the present invention.

FIG. 13 is a plan view of another example of the backlight device according to the embodiment 3 of the present invention. In the backlight device shown in FIG. 13, a rotary prism 91 is provided in the vicinity of the incident part of the laser light source 7. By scanning the direction of the laser beams in time series by means of this rotary prism 91, the uniformization of the light quantity of the laser beams is achieved. By collimating with the reflection part 2 the laser beams whose light quantity is uniformized, the collimated lights whose light quantity is uniformized can be created. In addition, by scanning the laser beams, occurrence of the speckle noise can be reduced, because the phase of the laser beams is slightly changed in time series.

(Utilization of a Plurality of Laser Light Sources)

Figure 14:
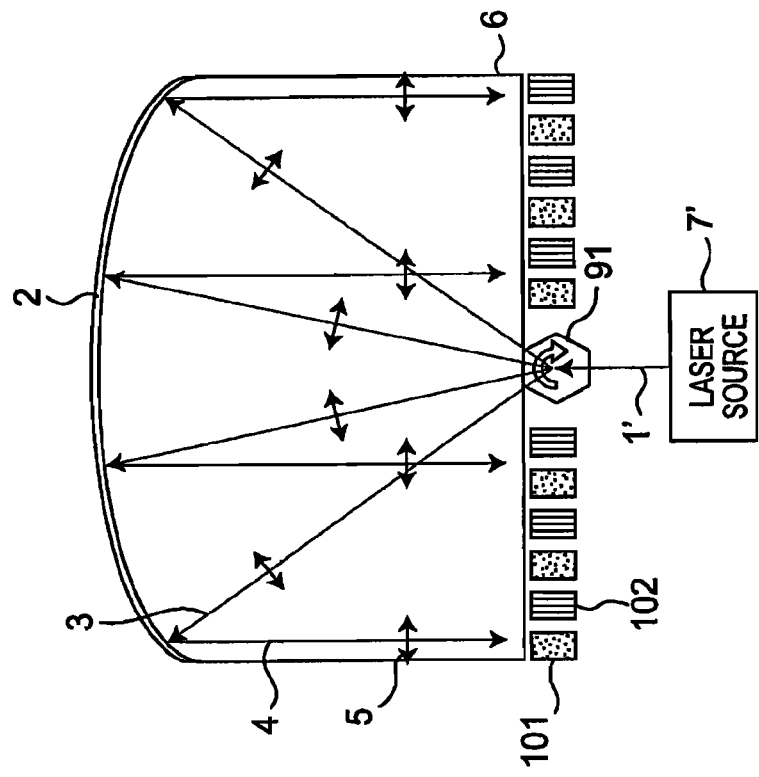
FIG. 14 is a plan view of an example of the backlight device according to the embodiment 3 of the present invention.

In addition, FIG. 14 is a plan view of another example of the backlight device according to the embodiment 3 of the present invention. In the backlight device shown in FIG. 14, a plurality of (n) laser light sources (7-(1), 7-(2), 7-(3), . . . 7-(*n*)) are provided for one waveguide plate 6. The structure thus using the plurality of laser light sources is effective in the following points. First, by setting a plurality of RGB laser light sources so that the laser beams are made incident on the waveguide plate, the display device with high luminance can be realized, even if the intensity of one laser beam is small. In this case, since the luminance of the light emitting intensity of one laser beam is lowered, a service life of the laser light source itself is significantly increased. Also, since the plurality of laser light sources are used, for example, even if failure of one laser light source occurs, it can be complemented by other laser light sources, and therefore the display device with further reliability can be realized. As the laser light source, it is possible to use a multi-array semiconductor laser, a stack of multi-array semiconductor lasers, or a structure in which a plurality of laser chips are arranged.

Further, such a structure is effective for reducing the speckle noise. Namely, by generating the laser beams from a plurality of light emitting points, a complicated wave surface is formed and the generation of the speckle noise is suppressed. In addition, by suitably switching an output of the plurality of laser light sources, an interference pattern is multiplexed, thus making it possible to suppress the speckle noise.

(Utilization of a Plurality of Wavelengths)

By slightly differentiating the wavelengths of the plurality of laser light sources, the speckle noise can be made further small. Preferably the difference in spectrum is 0.2 nm or more, and further preferably is 1 nm or more.

In addition, when the semiconductor laser is used as the laser light source, it is known that by superimposing high frequency on a drive current, an oscillation spectrum of laser is expanded. Expansion of the spectrum makes it possible to reduce the coherence, thus making it also possible to reduce the speckle noise.

(A Wavelength Conversion Laser and a Semiconductor Laser)

Figure 15:
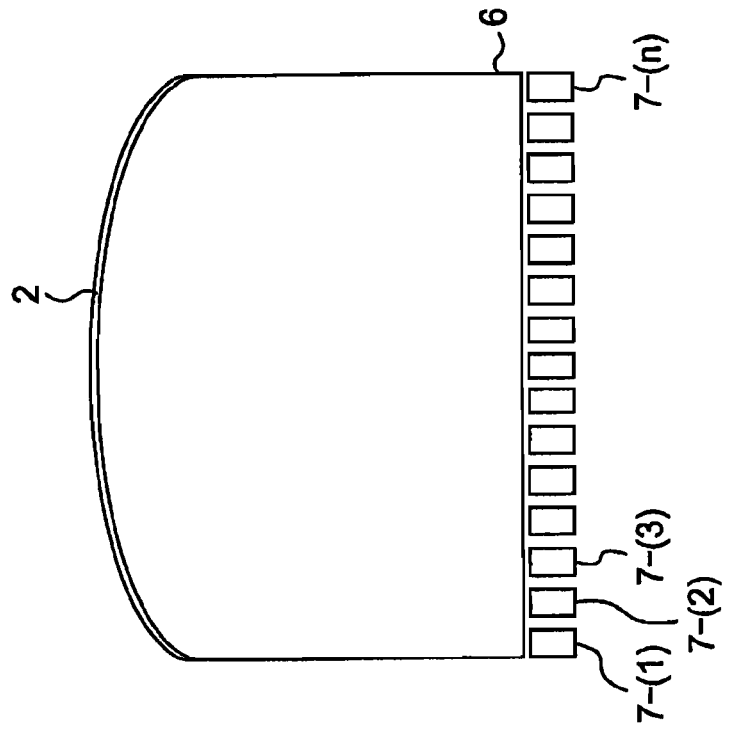
FIG. 15 is a plan view of an example of the backlight device according to the embodiment 3 of the present invention.

FIG. 15 is a plan view of further another example of the backlight device according to the embodiment 3 of the present invention. The backlight device shown in FIG. 15 includes a green laser (light source) 7' disposed in the center of the lower end portion of the waveguide plate 6; the rotary prism 91 disposed in the vicinity of the incident part of the waveguide plate of the green laser beam 1'; a plurality of red lasers (light sources) 101 and blue lasers (light sources) 102 respectively disposed on the lower end portion of the waveguide plate 6 other than the vicinity of the rotary prism 91; and the waveguide plate 6 having the reflection part 2 provided on the upper end portion.

In the backlight device shown in FIG. 15, a mechanism for making the laser beams incident on the waveguide plate is different, between the green laser beam, and blue laser beam and red laser beam.

First, the green laser beam 1' is made incident on the waveguide plate 6 via the rotary prism 91. The green laser beam is scanned in the waveguide plate 6, reflected with the reflection part 2, and collimated. The polarization of the laser beam 1' is parallel to the surface of the waveguide plate, and the polarization of the collimated lights 4 is converted to be almost parallel to the incident end face. Meanwhile, the blue laser 102 and the red laser 101 are semiconductor lasers, and a plurality of red laser beams and blue laser beams are incident from other part of the end face of the waveguide plate 6. The plurality of red lasers 101 and blue lasers 102 are alternately arranged, so that the uniformity of color can be insured.

When the backlight device capable of performing full-color display by using the RGB lasers is constituted, the green laser light source serves as the laser light source using wavelength conversion. Specifically, the green laser is a wavelength conversion laser having a structure in which wavelengths of a basic wave light source such as solid laser and fiber laser are converted by Mg doped $LiNbO_3$ having a periodic polarization inversion structure. Conversion efficiency of the wavelength conversion laser depends on a basic wave power, and therefore a basic wave laser of high output is required for high efficient conversion, resulting in an output light with small number of beams such as 1 beam or 2 beams. This is because, when the number of the beams is increased, the output per one beam is lowered, thus lowering the conversion efficiency. In addition, the wavelength conversion laser provides high efficient conversion and therefore has a high beam quality, thus narrowing a spectrum width. Therefore, a large speckle noise occurs. Further, in the green laser beam, the speckle noise is easily sensed because visibility of human being is high.

Meanwhile, a plurality of semiconductor lasers are used in the red laser light source and the blue laser light source. In a case of the semiconductor laser, the spectrum width in a single body can be widened by using the LD of wide stripe. Further, by making the wavelengths of the plurality of semiconductor lasers varied by about several nm, the speckle noise can be significantly suppressed. Further, by adding high frequency superimposition on the drive current, it is possible to expand the spectrum and reduce the speckle noise. Accordingly, in the RGB lasers, the reduction of the speckle noise is particularly important in the green laser, being the wavelength conversion laser.

In the backlight device shown in FIG. 15, by scanning green laser beam in the waveguide plate 6, the reduction of the speckle noise is achieved. As described above, the green laser beam has a small number of beams, and even if the beam is scanned by the rotary prism or a polygon mirror, the structure of an overall device can be maintained in a small shape.

Also, in the red laser and the blue laser, the speckle noise can be reduced by another mechanism as described above. However, a plurality of laser light sources must be used. (As described above), regarding the green laser, the structure of scanning a beam is effective for reducing the speckle noise. Further, the green laser has lowest power efficiency out of the RGB lasers. Therefore, in order to improve the power efficiency of the backlight device, it is effective to improve the use efficiency of the green laser. Namely, the green laser is set as a single polarization, the beam is scanned, reflected, and collimated, and the polarizations are made parallel inside the waveguide plate 6, thus achieving improvement in the use efficiency. This also makes it possible to improve the efficiency of the backlight device.

As described above, regarding the semiconductor laser for the red laser and the blue laser, the reduction of the speckle noise is possible by using a plurality of laser light sources. Therefore, preferably a plurality of laser beams is made incident from other part of the end face of the waveguide plate. At this time, preferably further plurality of laser beams are emitted from the front face of the waveguide plate before the incident light reaches the reflection part. Namely, the waveguide plate is preferably designed so that scattering efficiency is changed depending on wavelengths (namely, so that there are many red and blue and few green, due to scattering of the waveguide plate).

(Wavelength Conversion Laser, Semiconductor Laser, and the Waveguide Plate of Two-Layer Structure)

FIG. 16 is a plan view (a) and a side sectional view (b) of further another example of the backlight device according to the embodiment 3 of the present invention. The side sectional view (b) is a vertical sectional view passing through the central vertical axis (not shown) of the plan view (a).

In the backlight device shown in FIG. 16, the waveguide plate has a two-layer structure of the first waveguide plate 61 and the second waveguide plate 62 (see FIG. 10). The green laser beam 1' is incident from the lower end face of the first waveguide plate 61, reflected by a rectangular prism 63 constituting the reflection part 2, and thereafter emitted from the surface of the second waveguide plate 62 while propagating through the second waveguide plate 62, thus constituting a planar light source. Meanwhile, the red laser 101 and the blue laser 102 are incident from the lower end face of the second waveguide plate 62, and emitted from the surface of the second waveguide plate 62.

The green laser beam 1' is reflected and collimated with the reflection part 2, and the collimated lights having the polarization almost parallel to the incident end face are propagated through the second waveguide plate 62. Thus, transmitted polarized light transmitted through the liquid crystal panel set on the surface of the backlight device and parallel polarized light can be made coincident to each other, thus making it possible t improve the use efficiency of the green laser beam.

A first wavelength filter 2001 and a second wavelength filter 2002 are set in the vicinity of upper and lower end faces of the second waveguide plate 62. The green laser beam is transmitted through the first wavelength filter 2001, and red and blue laser beams are reflected thereby. The green laser beam that transmits thorough the first waveguide plate 61 is reflected by the reflection part 2 and is passed through the first filter 2001. Meanwhile, blue and red laser beams are reflected by the first filter 2001. Further, the green laser beam is reflected by the second filter 2002 and the blue and red laser beams are reflected thereby. Further in addition, the second filter 2002 has a structure of transmitting the red and blue laser beams from micropores formed at prescribed (plural) positions. Thus, by reflecting the laser beams by the upper and lower end faces, the use efficiency of the laser beams can be significantly increased.

The laser beam by the wavelength conversion laser, being the green laser light source, has a small spread angle, and therefore a considerable propagation distance is required for uniformizing the light quantity. Therefore, preferably the spread of the beam is realized by the waveguide plate of a first layer (first waveguide plate 61), and the green laser beam is planarly emitted, with the waveguide plate of a second layer (second waveguide plate 62) as a backlight light source.

When a plurality of semiconductor lasers is used, there are a plurality of light emitting points. Therefore, a waveguide distance for uniformizing the light quantity may be short. Accordingly, by making the laser beams incident on the second waveguide plate 62 and emitted therefrom, the uniformization of the red and blue laser beams is possible.

As described above, by making the green laser beam and the red and blue laser beams incident from different waveguide plates, a free degree of a place for setting the light source is increased, thus making it possible to miniaturize a system. In addition, the uniformity of the green laser beams is improved compared to a case that the waveguide plate has the one-layer structure (see FIG. 15). Further, when the waveguide plate has the one-layer structure, the green laser is arranged in the central part of the lower end face of the waveguide plate, and the red and blue laser beams are arranged in its peripheral part. Therefore, there is a possibility that color irregularity is generated on the display screen. However, when the waveguide plate is separated into two layers, the incident part of the red and blue lasers can also be set in the vicinity of the center of the lower end face of the waveguide plate, and therefore the uniformity of color is significantly improved. In addition, by separating the incident part, construction of the structure of scanning the green laser is facilitated, thus making it possible to further reduce the speckle noise.

Organic materials such as polycarbonate and photopolymer are assumed to be used as waveguide plates. Absorption loss of the green laser beam caused by such materials is small, such as about half of the blue laser beam. Therefore, in the green laser beam, loss by absorption is relatively small, even if an optical path is taken longer by reflecting it by the reflection part. Meanwhile, in the blue laser beam having the wavelength of about 450 nm, non-absorption amount is relatively large, and therefore it is important to be emitted from the waveguide plate 6 before reflected by the reflection part, for achieving a high use efficiency.

The waveguide plate will be explained. The waveguide plate has a role of propagating the laser beam, and a role of forming a planar radiation light source by scattering the laser beams to the front surface. In order to more excellently scatter the laser beams, mainly the following systems are given:

(a) system of mixing beads, being diffusion particles, into the waveguide plate;

(b) system of providing unevenness for diffusion, on the rear surface of the waveguide plate;

(c) system of using both of the above-described (a) and (b).

Conventionally, when the laser beams travel through the waveguide plate including the diffusion particles (the waveguide plate according to the system of the above-described (a)), it has been so considered that the laser beams are scattered and the polarization of the laser beams is set in a random state. When an experiment is actually performed, in a case of the green laser beam, it is found that even if the laser beams are made incident on the waveguide plate of about 50 inch, the polarization of light of about 80% is maintained. Namely, it is verified that the use efficiency of the laser beams can be improved by 1.6 times, with a simple structure. Further, it is found that by slightly scanning the green laser beam in the waveguide plate including the diffusion particles (the waveguide plate according to the system of the above-described (a)), the speckle noise is significantly reduced to a level hardly observed visually. Namely, in the structure of the backlight device shown in FIG. 16, first, significant reduction of the speckle noise is possible, and further significant improvement in the use efficiency of the laser beams by polarization maintaining effect is possible, even in a structure of including the diffusion particles in the waveguide plate in which conventionally maintaining polarization is considered to be difficult. Further in addition, it is possible to obtain advantages such as improving beam quality of the laser light source, forming the laser light source in a multiple mode, or significantly reducing luminance irregularity of backlight illumination that is generated by non-uniformity of the waveguide plate.

Note that in addition to a backlight of an image display system by the liquid crystal panel, the backlight device shown in the explanation regarding the aforementioned embodiment 1 through the embodiment 3 can be used as other display device and further can be used as the light source such as a two-dimensional planar lighting device. The two-dimensional planar lighting device may be formed in a planar shape or curved shape.

Embodiment 4

FIG. 17 is a schematic block diagram of a liquid crystal display device 200 of the present invention. The liquid crystal display device 200 shown in FIG. 17 includes a liquid crystal panel part 201; a backlight device 202 for lighting the liquid crystal panel part 201; and an LCD (Liquid Crystal Display) controller 203 for driving the liquid crystal panel part 201. The backlight device 202 here is the one explained in the embodiment 1 through embodiment 3.

The liquid crystal panel 201 is provided on the front surface (left direction in FIG. 17) of the backlight device 202. Further, the liquid crystal panel 201 is connected to the LCD controller 203, so as to receive/transmit each kind of electric signal from/to the LCD controller 203. The LCD controller 203 controls an operation of the liquid crystal panel part 201 in accordance with an image signal inputted from outside.

By utilizing the display device of the present invention, image display with uniform light quantity and high output efficiency can be realized. Further, the display device of the present invention has advantages of low power consumption and high color reproducibility.

INDUSTRIAL APPLICABILITY

A light source device of the present invention is a two-dimensional light source capable of uniformizing a light quantity in a two-dimensional plane and uniformizing polarization simultaneously. Using the present invention, use efficiency of light is significantly improved, and the light source device of lower power consumption is realized, and its practical advantage is tremendous. In addition, miniaturized structure is possible, thus making it possible to be applied to a mobile purpose of use, and by the low power consumption, high luminance image formation and a battery drive of long time period are possible.

The invention claimed is:

1. A light source device, comprising:
a laser light source of a single polarization;
a waveguide plate;
a reflection part provided on an end portion of the waveguide plate; and
a lens part provided in the waveguide plate,
wherein laser beams from the laser light source are propagated through the waveguide plate, and thereafter collimated with the reflection part, and polarization directions of the collimated laser beams are parallel to each other, and
wherein the waveguide plate has a two-layer structure, and the laser beams emitted from the laser light source are guided through a first layer of the waveguide plate as a diffused light, and thereafter are converted to a collimated light with the reflection part, and are propagated through a second layer of the waveguide plate.

2. A light source device, comprising:
a laser light source of a single polarization;
a waveguide plate;
a reflection part provided on an end portion of the waveguide plate; and
a lens part provided in the waveguide plate,
wherein laser beams from the laser light source are propagated through the waveguide plate, and thereafter collimated with the reflection part, and polarization directions of the collimated laser beams are parallel to each other,
wherein the device comprises a red laser light source, a blue laser light source, and a green laser light source,
wherein the green laser light source is composed of a light source of a wavelength conversion laser, the waveguide plate has a two-layer structure including a first layer and a second layer, and a green laser beam of the green laser light source is incident on a first layer of the waveguide plate, and thereafter guided through the first layer of the waveguide plate, converted to a collimated light with the reflection part, and guided through the second layer of the waveguide plate,
wherein a red laser beam of the red laser light source and a blue laser beam of the blue laser light source are incident from an end face of the second layer of the waveguide plate, and
the red laser beam of the red laser light source, the blue laser beam of the blue laser light source, and a green laser beam of the green laser light source are emitted from a surface of the second layer of the waveguide plate.

\* \* \* \* \*